(12) United States Patent
Moravek et al.

(10) Patent No.: US 10,221,315 B2
(45) Date of Patent: Mar. 5, 2019

(54) CURABLE FILM-FORMING COMPOSITION COMPRISING CATALYST ASSOCIATED WITH A CARRIER

(71) Applicant: PPG Industries Ohio, Inc., Cleveland, OH (US)

(72) Inventors: Scott Moravek, Cranberry Township, PA (US); Davina Schwartzmiller, Rural Valley, PA (US); Jane Valenta, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 677 days.

(21) Appl. No.: 14/075,240

(22) Filed: Nov. 8, 2013

(65) Prior Publication Data

US 2015/0132497 A1 May 14, 2015

(51) Int. Cl.
| | |
|---|---|
| *C08L 89/00* | (2006.01) |
| *C08L 75/02* | (2006.01) |
| *C09D 5/00* | (2006.01) |

(52) U.S. Cl.
CPC ............... *C08L 89/00* (2013.01); *C08L 75/02* (2013.01); *C09D 5/00* (2013.01)

(58) Field of Classification Search
CPC ...... C08L 175/02; C08L 189/00; C08L 75/02; C08L 89/00; C09D 5/00
See application file for complete search history.

(56) References Cited

U.S. PATENT DOCUMENTS

| | | | |
|---|---|---|---|
| 3,860,565 A * | 1/1975 | Barber, Jr. ........... | C08G 18/022 204/157.82 |
| 3,963,680 A | 6/1976 | O'Keefe et al. | |
| 4,252,708 A | 2/1981 | Newell | |
| 5,726,233 A | 3/1998 | Mitchell et al. | |
| 5,726,456 A | 3/1998 | Lupton et al. | |
| 6,013,698 A | 1/2000 | Lupton et al. | |
| 6,262,152 B1 | 7/2001 | Fryd et al. | |
| 2002/0169233 A1* | 11/2002 | Schwantes ............... | B01J 13/04 523/200 |
| 2005/0234194 A1 | 10/2005 | Saiga et al. | |
| 2007/0173602 A1 | 7/2007 | Brinkman et al. | |
| 2008/0182943 A1 | 7/2008 | Goetter et al. | |
| 2010/0112019 A1* | 5/2010 | Thevenet ................ | A61K 8/19 424/401 |
| 2011/0002831 A1 | 1/2011 | Arfsten et al. | |
| 2011/0104495 A1 | 5/2011 | Lalgudi et al. | |
| 2011/0236498 A1 | 9/2011 | Marteaux et al. | |
| 2012/0199671 A1 | 8/2012 | De Schrijver et al. | |
| 2013/0017405 A1 | 1/2013 | Benkoski et al. | |
| 2013/0085222 A1 | 4/2013 | Fasano et al. | |

FOREIGN PATENT DOCUMENTS

| | | |
|---|---|---|
| CA | 2341977 | 2/2001 |
| EP | 0300643 A2 | 1/1989 |
| EP | 0396092 A2 | 11/1990 |
| EP | 1146060 A2 | 10/2001 |
| EP | 1834524 A2 | 9/2007 |
| GB | 1201902 A | 8/1970 |
| GB | 1482545 A | 8/1977 |
| JP | 2983234 B2 | 11/1999 |
| JP | 2001048903 B1 | 2/2001 |
| JP | 4102274 B | 3/2008 |
| WO | WO 8300154 A1 | 1/1983 |
| WO | 90/02655 A1 | 3/1990 |
| WO | WO 9315131 A2 | 8/1993 |
| WO | 2012/151357 A2 | 11/2012 |
| WO | 2012/151409 A2 | 11/2012 |

OTHER PUBLICATIONS

Yuan et al. "Synthesis of poly(urea-formaldehyde) encapsulated dibutyltin dilaurate through self-catalysis of core materials" Polym. Bull. (2014) 71:261-273. published online Sep. 8, 2013.*

Carlton et al., "Microencapsulated Catalyst and Energetic Compound Containing Same", United States Statutory Invention Registration No. H778, May 11, 1990, USA.

* cited by examiner

*Primary Examiner* — Robert S Walters, Jr.

(74) *Attorney, Agent, or Firm* — Krisanne Shideler

(57) ABSTRACT

A coating composition is disclosed comprising a film-forming resin and a catalyst component. The catalyst component comprises a catalyst contained within or encapsulated by a carrier; at least some of the catalyst is capable of being released from the carrier via diffusion through the carrier and into the coating composition. Methods of controlling the rate of cure of a curable film-forming composition and increasing the pot life of the composition by adding such catalyst components are also disclosed.

4 Claims, No Drawings though the carrier and into the coating composition. Methods of controlling the rate of cure of a curable film-forming composition and the pot life thereof, by adding such catalyst components are also provided by the present invention.

CURABLE FILM-FORMING COMPOSITION COMPRISING CATALYST ASSOCIATED WITH A CARRIER

FIELD OF THE INVENTION

The present invention relates to a coating composition that comprises a film-forming resin and a controlled-release catalyst associated with a carrier, as well as methods for controlling the rate of cure of a curable film-forming composition.

BACKGROUND INFORMATION

Coatings have been used in various industries for a wide range of metallic and non-metallic substrates. Certain coatings, particularly in the refinish industry, must be provided as two or more components that are maintained separately until just prior to application since the components will begin to react upon contact. The practice of supplying coatings as two or more separate components is common where ambient or moderate cure temperature is required. Examples include polyisocyanates and polyols, polyepoxides and polyamines, and polyanhydrides and polyols, in the Automotive Refinish Industry for example, a polyol and catalyst are typically supplied as one coating component and a polyisocyanate is supplied as the other coating component. These components are then weighed, mixed, sprayed on to an automobile and allowed to cure to form a polyurethane coating.

The two component approach presents several challenges when applying a coating. One is the need to accurately weigh each component so the reactive groups, such as the isocyanate and hydroxyl groups, are in an acceptable ratio. Another is the need to work in a timely manner so that the mixed components maintain a low enough viscosity for spraying. The span of time during which the coating is ready to apply and still of low enough viscosity to be applied is commonly referred to as "pot life."

Typically, pot life must be balanced with cure speed of the applied coating. For instance, in a multi-component coating system that uses a catalyst, the pot life and cure speed are primarily controlled by the amount of catalyst present. Accordingly, if a fast cure speed is required more catalyst can be used but that will also cause a shorter pot life. Conversely, if a longer pot-life is needed less catalyst can be used but the cure speed would also be retarded.

It is also important that the applied coating composition dry and harden quickly so that dirt pick-up is minimized and valuable shop space isn't occupied with the coated substrate, such as an automobile, while it is drying. The length of time between when a coating is applied to a substrate and when the coating has dried or cured sufficiently that dust falling onto the coated substrate will not stick to the coated substrate is referred to as "dust-free time" and is an indicator of the speed of cure. One way to speed the drying and cure of the composition is to add additional catalyst, but this shortens the time available for spraying since higher catalyst levels also cause viscosity of the composition to increase more quickly.

Therefore, it would be desirable to have a coating system for use at ambient temperature where the pot life and cure speed may be better controlled.

SUMMARY OF THE INVENTION

A coating composition is provided, comprising a film-forming resin and a catalyst component. The catalyst component comprises a catalyst contained within or encapsulated by a carrier; at least some of the catalyst is capable of being released from the carrier via diffusion through the carrier and into the coating composition. Methods of controlling the rate of cure of a curable film-forming composition and the pot life thereof, by adding such catalyst components are also provided by the present invention.

DETAILED DESCRIPTION OF THE INVENTION

As used herein the term "film-forming resin" means any of a variety of resins that are designed to undergo chemical reactions under appropriate conditions, such as oxidation, heat, or presence of a suitable co-reactant, catalyst or crosslinking agent. The resin can have functional groups that are reactive with either themselves or another reactive component, such as a crosslinking agent, or both. The film-forming resin may be water-based or solvent-based liquid compositions.

Non-limiting examples of film-forming resins suitable for use with the present invention include (meth)acrylic polymers, polyester polymers, polyurethane polymers, polyamide polymers, polyether polymers, polysiloxane polymers, polyepoxy polymers, epoxy resins, vinyl resins, copolymers thereof, and mixtures thereof. Generally, these polymers can be any polymers of these types made by any method known to those skilled in the art. Such polymers may be solvent-borne, water-borne or water-dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof. Appropriate mixtures of film-forming polymers or resins may also be used in the preparation of the present coating compositions. For example, the coating compositions can comprise any of a variety of curable compositions known in the art.

The film-forming resin can further comprise a crosslinker. The crosslinker, or crosslinking resin or agent, can be any suitable crosslinker or crosslinking resin known in the art, and will be chosen to be reactive with the functional group or groups on the film-forming resin. Non-limiting examples of suitable crosslinkers include phenolic resins, amino resins, carbamate resins, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. In certain embodiments, the crosslinker is a hexamethylene diisocyanate based polyisocyanate. Such crosslinkers are commercially available from Bayer MaterialScience as Desmodur N3400 or 3600.

The film-forming resin may be prepared as a one-package (1K) system, or a two-package (2K) system with the crosslinker in a separate package from the reactive polymer(s) in the film-forming resin, depending on the reactivity of the various components with each other.

As mentioned above the coating composition of the present invention includes a catalyst component. As used herein, the term "catalyst" refers to a substance that initiates and/or increases the rate of the curing reaction. The catalyst may include metal catalyst, amine catalyst, acid catalyst, ionic liquid catalyst or a combination thereof, as well as other catalysts known in the art. Non-limiting examples of catalysts that are suitable for use with the present invention include those formed from tin, cobalt, calcium, cesium, zinc, zirconium, bismuth, and aluminum as well as metal salts of carboxylic acids, diorganometallic oxides, mono- and diorganometallic carboxylates, and the like. In embodiments, the metal catalyst comprises calcium naphthanate, cesium naphthanate, cobalt naphthanate, dibutyl tin dilaurate, dibutyl tin diacetate, dibutyl tin dioctoate, and dibutyl tin naphthanate. Suitable amine catalysts include, for example, tertiary amine catalysts, including but not limited to triethylamine, 1,4-diazabicyclo[2.2.2]octane, 1,8-diazabicyclo[5.4.0]undec-7-ene, and N-ethylmorpholine. The catalyst may additionally be "blocked", for example, with an acid or thiol, as is known in the art to further inhibit its activity until desired.

The catalyst is associated with a carrier. As used herein, the term "associated with" in reference to the carrier refers to any substance in which all or part of a catalyst is contained, encapsulated by, hydrogen bonded with, or otherwise non-covalently associated. In an embodiment, the carrier includes a microcapsule shell or encapsulant containing the catalyst in its core. As used herein the terms "microcapsule shell" and "encapsulant" mean a small structure of any shape and texture containing a core or internal space that is enclosed within the structure. In embodiments the catalyst can be partially encapsulated in the structure such that the structure does not entirely enclose the catalyst within the core. In another embodiment, the carrier includes a solid matrix type capsule with the catalyst contained entirely or partially therein.

The carrier comprises a material that will protect or isolate the catalyst, thus inhibiting or even preventing it from initiating a curing reaction with the film-forming resin, and upon exposure to a diffusion-promoting environment will release some or all of the catalyst. The degree to which the catalyst is effectively protected can be adjusted based upon selection of the associated carrier material. The particle size of the carrier associated with catalyst can also be adjusted. The carrier is also selected to be compatible with the film-forming resin, though typically it is not formed from any component of the film-forming resin. As used herein, the term "compatible" means the carrier disperses in and remains stable when combined with the film-forming resin; it is not typically soluble or reactive with the resin prior to exposure to a diffusion-promoting environment. In certain embodiments, the carrier is soluble and/or reactive with the coating composition after exposure to a diffusion-promoting environment.

In certain embodiments of the invention the carrier comprises a polymer and/or copolymer, which may be cross-linked, and/or a copolymer having hydrophilic and hydrophobic character. In certain embodiments the carrier can be made of gelatin, polyoxymethylene urea formaldehyde, melamine formaldehyde, or polyurethane. In other embodiments, the carrier comprises silica, such as the use of silica as an encapsulant. In certain embodiments the carrier is an encapsulant made of a gelatin or polyoxymethylene urea (PMU) formaldehyde shell, and contains a core material consisting of dibutyltin dilaurate (DBTDL) catalyst. Such encapsulants are commercially available from Lipo Technologies, Inc. The carrier is not typically prepared from aromatic polyisocyanates.

In embodiments, the catalyst comprises 1-99 weight percent of the total solid content of the component (catalyst and carrier), or in other examples the catalyst comprises 40 to 90 weight percent.

In certain embodiments of the invention the coating composition contains more than one type of catalyst. The catalysts can be associated with the same type of carrier or a plurality of different types of carriers. If the film-forming resin is prepared as a two-package system, the catalyst component may be added to either one or both of the packages. Additionally, different catalyst components comprising different catalysts and/or different carriers may be added to each of the packages.

If desired, the coating composition can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids, colorants, abrasion resistant particles and other customary auxiliaries.

As used herein, the term "colorant" means any substance that imparts color and/or other opacity and/or other visual effect to the composition, The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions, A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavandirone, pyranthrone, anthanthrone, dioxazine, triarylcarbonium, quinophthalone pigments, diketo pyrrolo pyrrole red ("DP-PBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent- and/or aqueous-based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and trial methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application Ser. No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochrornism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles, For example, the particles can be microparticles, having an average particle size of 0.1 to 50, 0.1 to 20, 1. to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

The unique nature of the coating compositions of the present invention, comprising a film-forming resin and a catalyst associated with a carrier, may enable them to be provided and stored as one-component compositions prior to use because some or all of the catalyst can be isolated from reacting until desired. A one-component composition will be understood as referring to a composition wherein all the coating components are maintained in the same container after manufacture, during storage, etc. A typical one-component coating can be applied to a substrate and cured by any conventional means, such as by heating, forced air, radiation cure and the like. For some coatings, such as ambient cure coatings, it is not practical to store them as a one-component, but rather they must be stored as multi-component coatings to prevent the components from curing prior to use. The term "multi-component coatings" means coatings in which various components are maintained separately until just prior to application. The present coatings can also be multi-component coatings, such as the two-component coatings described in the background section.

The catalyst is capable of being released from the carrier via diffusion through the carrier and into the coating composition, typically upon application of a stimulus, allowing for user control of the initiation and/or rate of cure of the coating composition. The stimulus may be as straightforward as the admixture of the catalyst component with the film-forming resin. One or more components of the film-forming resin, e.g., a resin or volatile solvent, may cause the catalyst capsule to swell upon exposure thereto, such that the carrier may release the catalyst.

Elevation of temperature above the glass transition temperature of a polymeric carrier may cause loss of structural integrity of the carrier, allowing for release of the catalyst via diffusion through the carrier. A pH fluctuation or addition of a solvent may swell, dissolve or otherwise degrade a carrier to initiate or promote diffusion of the catalyst.

In certain embodiments of the present invention, the coating composition further comprises a solvent that inhibits diffusion of the catalyst through the carrier and into the coating composition. In such embodiments, diffusion of the catalyst through the carrier and into the coating composition is initiated or enhanced upon evaporation of the solvent. Evaporation of the solvent may occur, for example, upon application of the coating composition to a substrate, In certain embodiments such solvents are selected so that they demonstrate low polarity Hansen solubility parameters and low hydrogen bond Hansen solubility parameters relative to the other components of the coating composition.

Hansen solubility parameters are derived from the Hildebrand solubility parameter and are a way of predicting if one material will dissolve in another and form a solution. They are based on the idea that like dissolves like where one molecule is darned as being 'like' another if it bonds to itself in a similar way. Specifically, each molecule is given three Hansen parameters, each generally measured in $MPa^{0.5}$:

$\delta_d$ The energy from dispersion forces between molecules (dispersion parameter)

$\delta_p$ The energy from dipolar intermolecular force between molecules (polarity parameter)

$\delta_h$ The energy from hydrogen bonds between molecules (hydrogen bond parameter)

The total cohesion energy of a liquid, E, can be divided into at least 3 separate parts by experiment or calculation. In the Hansen approach these parts quantitatively describe the nonpolar, atomic (dispersion) interactions, $E_D$, permanent dipole-permanent dipole molecular interactions, $E_P$, and the hydrogen bonding (electron interchange) molecular interactions, $E_H$.

$$E = E_D + E_P + E_H \qquad \text{Eq. 1}$$

E can be experimentally measured by determining the energy required to evaporate the liquid, thus breaking all of its cohesion bonds in the process.

$$E = \Delta H_V - RT \qquad \text{Eq. 2}$$

where $\Delta_V$ is the measured (or predicted) latent of vaporization, R is the universal gas constant, and T is the absolute temperature. Dividing Equation 1 by the molar volume, V, gives the respective Hansen cohesion energy (solubility) parameters according to Eq. 4.

$$E/V = (E_D/V) + (E_P/V) + (E_H/V) \qquad \text{Eq. 3}$$

$$\delta^2 = \delta_D^2 + \delta_P^2 + \delta_H^2 \qquad \text{Eq. 4}$$

The total cohesion energy divided by the molar volume is the total cohesion energy density. The square root of this is the Hildebrand total solubility parameter, $\delta$. As noted above, the SI units for all of these are $MPa^{1/2}$.

In certain embodiments useful solvents typically demonstrate a Hansen solubility polarity parameter of 0 to 3.5, and a Hansen solubility hydrogen bond parameter of 0 to 6.0. Examples of suitable solvents include hexane, xylene, and toluene.

The present invention is further directed to a method of controlling the rate of cure of a curable film-forming composition. The method includes:
(a) adding to the curable film-forming composition a catalyst component comprising a catalyst associated with a carrier, wherein at least some of the catalyst is capable of being released from the carrier via diffusion through the carrier and into the coating composition;
(b) applying the curable film-forming composition to a substrate to form a coated substrate; and
(c) exposing the coated substrate to conditions for a time sufficient to cure the curable film-forming composition.

The curable film-forming compositions may comprise any of the film-forming resins described above. Likewise, the catalyst component may be prepared as described above.

In certain embodiments of the invention, at least some of the catalyst is released from the carrier via diffusion through the carrier and into the coating composition upon addition of the catalyst component to the curable film-forming composition during step (a). Alternatively, the curable film-forming composition may contain a solvent that inhibits release of the catalyst from the carrier and into the coating composition. In such instances, the solvent evaporates during step (b) and/or step (c), allowing for subsequent diffusion of the catalyst through the carrier. Suitable solvents include hexane, toluene, and xylene.

In other embodiments, the catalyst component may be mixed with a solvent that initiates diffusion of the catalyst through the carrier prior to adding the catalyst component to the curable film-forming composition. Such solvents may include n-butyl acetate.

It can be appreciated that the thickness and composition of the encapsulant shell may be adjusted in concert with the identity of the solvent to further control the rate of diffusion of the catalyst from the encapsulant.

The composition can be applied to the substrate in liquid form. The composition can be applied by any means standard in the art, such as spraying or electrostatic spraying using an atomizer, spray gun, aerosol, or bell applicator and the like. Application may also be by brushing, dip coating, roll coating, curtain coating, and other methods known in the art.

Once diffused through the carrier, the catalyst is available to initiate, accelerate, and/or otherwise facilitate cure. By associating the catalyst with a carrier the catalyst can be mixed or dispersed into the composition, and will not react or cure appreciably until it is purposefully released from the carrier. This controlled release of catalyst can extend the pot life of a curable film-forming composition beyond that which would otherwise be possible by eliminating or at least diminishing the usual inverse relationship of pot life and cure speed. A method of increasing the pot life of a curable film-forming composition is therefore also provided as a separate embodiment in accordance with the present invention, comprising adding to the curable film-forming composition a solvent and a catalyst component, wherein the catalyst component comprises a catalyst associated with a carrier, and at least some of the catalyst is capable of being released from the carrier via diffusion through the carrier and into the film-forming composition. The solvent inhibits release of the catalyst from the carrier and into the coating composition.

The cure speed of the composition can be modified by adjusting the amount of carrier-associated catalyst, while having minimal or no effect on pot life as compared to traditional freely added catalyst. In particular embodiments, prior to addition of the catalyst component, the composition is essentially free of catalyst that is not contained within or encapsulated by a carrier. In other words, there is no free catalyst present in the curable film-forming composition until the catalyst component is added to the composition and the catalyst is released from its carrier. Additional free catalyst that is the same as or different from that added in catalyst component may be added subsequently as desired, but is typically not necessary.

The present coatings can be applied to any substrates, for example, automotive substrates, industrial substrates, packaging substrates, wood flooring and furniture, apparel, electronics including housings and circuit boards, glass and transparencies, sports equipment including golf balls, and the like. These substrates can be, for example, metallic or non-metallic. Metallic substrates include tin, steel, tin-plated steel, chromium passivated steel, galvanized steel, aluminum, aluminum foil, coiled steel or other coiled metal. Non-metallic substrates including polymeric, plastic, polyester, polyolefin, polyamide, cellulosic, polystyrene, polyacrylic, poly(ethylene naphthalate), polypropylene, polyethylene, nylon, EVOH, poly(lactic acid), other "green" polymeric substrates, poly(ethylene terephthalate) ("PET"), polycarbonate, polycarbonate acrylonitrile butadiene styrene ("PC/ABS"), polyamide, polymer composites, wood, veneer, wood composite, particle board, medium density fiberboard, cement, stone, glass, paper, cardboard, textiles, leather, both synthetic and natural, and the like. The substrate can be one that has been already treated in some manner, such as to impart visual and/or color effect.

In embodiments the dry film thickness may vary as desired. For example, and without limitation, the coating compositions of the present invention can be applied to the substrate at a dry film thickness of 0.1 mils to 50 mils, such as 0.5 to 10 or 1 to 4 mils. In other embodiments, the coatings can be applied to a dry film thickness of 2 mils or greater, 4 mils or greater, 6 mils or greater, 8 mils or greater, 20 mils or greater, or even thicker.

In embodiments of the invention the coating composition is characterized by a pot-life that is tunable from a pot-life of less than one hour, which could result from the use of free catalyst, to a pot-life of four hours and longer based on the presence of free catalyst, catalyst associated with a carrier, and the effectiveness of carrier at isolating the associated catalyst. Thus by adding catalyst that is associated with a carrier, the observed pot-life can be extended beyond that which would be achieved using an equivalent amount of traditionally added free catalyst or catalyst that is not associated with a carrier.

In certain embodiments, the coating is a clearcoat. A clearcoat will be understood as a coating that is substantially transparent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat.

In certain other embodiments, the coating is a basecoat. A basecoat is typically pigmented; that is, it will impart some sort of color and/or other visual effect to the substrate to which it is applied.

The coating compositions of the present invention can be applied alone or as part of a coating system that can be deposited onto the different substrates that are described herein. Such a coating system typically comprises a number of coating layers, such as two or more. A coating layer is typically formed when a coating composition that is deposited onto the substrate is substantially cured. The coating compositions described above can be used in one or more of the coating layers described herein.

In certain embodiments, a clearcoat is deposited onto at least a portion of the basecoat coating layer. In certain embodiments, the substantially clear coating composition, or tinted clear, can comprise a colorant but not in an amount such as to render the clear coating composition opaque (not substantially transparent) after it has been cured. In certain instances, the BYK Haze value of the cured composition is less than 50, can be less than 35, and is often less than 20 as measured using a BYK Haze Gloss meter available from BYK Chemie USA.

In certain embodiments, the coatings of the present invention may be used in a monocoat coating system in a monocoat coating system, a single coating layer is applied over a substrate (which can be pretreated or non-pretreated) that can comprise one or more of the following layers (as described above): an electrodepositable coating layer or a primer-surfacer coating layer. In certain embodiments, the coating composition of the present invention is used in a monocoat coating system.

In certain embodiments, the coating is a primer. Generally, a primer promotes adhesion of subsequently applied coatings to the substrate, protects the substrate, such as from corrosion or UV exposure, improves surface smoothness and is often designed to be sandable.

As mentioned above, the coatings of the present invention can be used alone, or in combination with one or more other coatings, can comprise a colorant or not and can be used as a primer, basecoat, and/or top coat, or monocoat. For substrates coated with multiple coatings, one or more of those coatings can be coatings as described herein.

After application of the curable film-forming composition to the substrate, the coated substrate may be heated as necessary to a temperature and for a time sufficient to cure the curable film-forming composition. The curable film-forming compositions may be curable at ambient temperatures or elevated temperatures, depending on the crosslinking chemistry employed.

The coating compositions of the present invention can be used in any application appropriate for a curable coating composition. They can be useful in applications where ambient curable compositions are desired to exhibit a longer pot life. For example, the coatings are particularly suitable for use in the automotive industry. In a conventional coating system used in the vehicle refinish industry, many coatings are provided as multiple components because once mixed, the reaction proceeds and the reactive coating has a limited pot life. Curable coatings of this invention, that utilize a catalyst associated with a carrier, allow for coatings having longer pot life thus leading to increased productivity in coating application. This could further provide for improved coating physical properties and/or appearance in embodiments the catalyst is isolated from the rest of the coating until it is needed during or after application. However, while it is anticipated that the present curable coating composition can have multiple varied uses, it is not however an adhesive, and would not be expected to be effective in joining two substrates to form a structural connection or bond.

For purposes of the above detailed description, it is to be understood that the invention may assume various alternative variations and step sequences, except where expressly specified to the contrary. Moreover, other than in any operating examples, or where otherwise indicated, all numbers expressing ranges, amounts or percentages, for example, quantities of ingredients, used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include the endpoints of those ranges and all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent. For example, although reference is made herein to "a" catalyst, "a" film-forming resin and the like, one or more of each of these components, and of any other components, can be used. Singular encompasses plural and vice versa, unless specifically stated otherwise. In addition, in this application, the use of "or" means "and/or" unless specifically stated otherwise, even though "and/or" may be explicitly used in certain instances. As used herein, the term "polymer" refers to oligomers and both homopolymers and copolymers, and the prefix "poly" refers to two or more. "Including," "for example," "such as" and like terms means including, for example, such as, but not limited to.

The various embodiments and examples of the present invention as presented herein are each understood to be non-limiting with respect to the scope of the invention.

The invention will be further described by reference to the following examples. The following examples are merely illustrative of the invention and are not intended to be limiting

EXAMPLES

The following examples are presented to demonstrate the general principles of the invention. The Example describes the preparation of coating compositions according to embodiments of the present invention and compares them to analogous compositions that do not contain the materials and/or meet the parameters of the composition. All amounts listed are described in parts by weight, unless otherwise indicated. The invention should not be construed as limited to the specific examples presented, Example 1

Diffusion Rate Analysis of Catalyst Capsules:

3 g of gelatin catalyst capsules provided as an aqueous slurry (supplied by Lipo Technologies, Inc.) and 10 g of n-butyl acetate was placed in a separatory funnel and shaken every three minutes to mix. After the desired diffusion time, the solvent layer was pipetted off the top. The solvent layer was then analyzed for tin content, a component of the catalyst, by X-ray fluorescence spectroscopy (XRF). This was repeated for each diffusion time: 15, 30, 60, 120 and 240 minutes, to generate a diffusion profile, This procedure was also repeated for polyoxymethylene urea (PMU) formaldehyde catalyst capsules provided as an aqueous slurry (supplied by Lipo Technologies, Inc.). The results of the percent core release over time are summarized in Table 1.

TABLE 1

| Time (min) | % Core Release | |
| --- | --- | --- |
| | Gelatin Capsule | PMU Capsule |
| 15 | 0 | 2.0 |
| 30 | 1.5 | 3.7 |
| 60 | 13.8 | 14.7 |
| 120 | 28.0 | 29.6 |
| 240 | 35.9 | 42.8 |

After four hours, approximately 40% of the core contents had diffused through the shell material.

Example 2

Coating Formula Containing Catalyst Capsules:

To demonstrate the use of catalyst capsules, two-component coatings were prepared with varying catalyst preparations. Formula A, the first comparative coating, comprised 4.64 g Mammal VSM1004/75LGV2 (commercially available from Cytec Industries, Inc.) mixed with 3.84 g of D871 thinner (commercially available from PPG Industries, Inc.) combined with Desmodur N 3400 polyisocyanate (commercially available from Bayer Material Science). Formula B, the second comparative coating is the same Formula A but with 0.07 g of dibutyltin dilaurate added. Formula C, comprises Formula A with the addition the PMU capsule described in Example 1 at an amount such that the catalyst level is equal to that of Formula B.

The viscosity of the formulas was recorded over one hour in 15 minute intervals to evaluate the relative cure rate of the formulations as shown in Table 2. The time '0' measurement was taken directly after mixing the components of the coating together.

TABLE 2

Viscosity of example formulas over time.

| | Formula | | |
| --- | --- | --- | --- |
| Time (min) | A | B | C |
| | Viscosity[1] (cP) | | |
| 0 | 24.6 | 26.7 | 43.2 |
| 15 | 26.2 | 350.0 | 45.0 |
| 30 | 28.7 | gel | 46.9 |
| 45 | 30.2 | gel | 72.1 |
| 60 | 30.6 | gel | 125.5 |

[1]Measured on Brookfield CAP 2000 viscometer with #1 spindle at 900 RPM.

It can be seen from the data in Table 2 that the encapsulated catalyst provides a cure rate which is between the catalyzed and uncatalyzed comparative formulas. This allows for extended pot life as compared to traditional catalyzed systems while avoiding extremely slow cure rates of uncatalyzed systems.

Example 3

In a given system containing microcapsules diffusion will occur as illustrated in Example 1 above. This example demonstrates how solvent selection influences the rate of diffusion. The gelatin and PMU microcapsules, as describe in Example 1, were tested in the same manner as Example 1 except that instead of only n-butyl acetate as the solvent, hexane was also included at different hexane:n-butyl acetate ratios. Two hours of diffusion was carried out in solutions of 1:1 hexane:n-butyl acetate, 1:9 hexane:n-butyl acetate, and 100% hexane (100% n-butyl acetate is from Example 1). For the PMU microcapsules, the hexane was effective at slowing the diffusion of the core contents, especially when the ratio of hexane to n-butyl, acetate was greater than 1. The presence of hexane in any amount was able to essentially prevent diffusion of the gelatin core contents.

TABLE 3

Percent core release after two hours of diffusion time with varying hexane:n-butyl acetate composition

| | Capsule Type | |
|---|---|---|
| hexane:n-butyl acetate | Gelatin<br>% core release | PMU |
| 1:0 | 0 | 0 |
| 1:1 | 0 | 6 |
| 1:9 | 0 | 21 |
| 0:1 | 28 | 29 |

Hexane has low polarity and H-bonding Hansen parameters, high evaporation rate, and retards diffusion. Therefore, incorporating a solvent like hexane in a coating formulation containing encapsulated catalyst would retard diffusion until the hexane is removed such as by volatilizing during spray application. This would allow the remaining solvents, such as n-butyl acetate, to control the diffusion behavior of the system. As is demonstrated here, by carefully selecting the Hansen solubility characteristics and evaporation rates of the solvents used in the coating formulation, the rate and onset of diffusion can also be controlled.

Whereas particular embodiments of this invention have been described above for purposes of illustration, it will be evident to those skilled in the art that numerous variations of the details of the present invention may be made without departing from the invention as defined in the appended claims. It is understood, therefore, that this invention is not limited to the particular embodiments disclosed, but it is intended to cover modifications that are within the spirit and scope of the invention, as defined by the appended claims.

What is claimed is:

1. A method of controlling the rate of cure of a curable film-forming composition, comprising (a) adding to the curable film-forming composition a catalyst component comprising dibutyltin dilaurate catalyst encapsulated with a gelatin or polyoxymethylene urea formaldehyde carrier, wherein at least some of the catalyst is capable of being released from the carrier via diffusion through the carrier and into the film-forming composition, and wherein the carrier is not formed from any component of the film-forming composition;

(b) applying the curable film-forming composition containing the catalyst component to a substrate to form a coated substrate; and (c) exposing the coated substrate to conditions for a time sufficient to cure the curable film-forming composition; wherein the curable film-forming composition comprises a polymer having functional groups that are reactive with isocyanate groups, a polyisocyanate crosslinking agent, and a solvent that inhibits release of the catalyst from the carrier and into the coating composition, and wherein the solvent evaporates during the step of applying the curable film-forming composition to the substrate and/or during the step of exposing the coated substrate to conditions for a time sufficient to cure the curable film-forming composition.

2. The method of claim 1, wherein at least some of the catalyst is released from the carrier via diffusion through the carrier and into the curable film-forming composition upon addition of the catalyst component to the curable film-forming composition.

3. The method of claim 1, wherein the solvent demonstrates a Hansen solubility polarity parameter of 0 to 3.5, and a Hansen solubility hydrogen bond parameter of 0 to 6.0.

4. The method of claim 1, wherein the coated substrate is heated during the step of exposing the coated substrate to conditions for a time sufficient to cure the curable film-forming composition.

* * * * *